United States Patent [19]

Sato et al.

[11] 4,129,342
[45] Dec. 12, 1978

[54] ANTI-SKID BRAKE CONTROL DEVICE

[75] Inventors: Makoto Sato, Kamifukuoka; Hiroshi Takamatsu, Ohimachi; Yoshitaka Miyagawa, Kawagoe; Etsuo Fujii, Wako, all of Japan

[73] Assignee: Honda Giken Kogyo Kabushiki Kaisha, Tokyo, Japan

[21] Appl. No.: 762,782

[22] Filed: Jan. 25, 1977

[30] Foreign Application Priority Data

Jan. 29, 1976 [JP] Japan .................................. 51-8682
Feb. 2, 1976 [JP] Japan ................................. 51-10195
Feb. 16, 1976 [JP] Japan ................................. 51-15607

[51] Int. Cl.² .............................................. B60T 8/08
[52] U.S. Cl. ............................. 303/105; 188/181 A; 303/113; 303/119
[58] Field of Search ................... 188/181; 303/91–119, 303/20

[56] References Cited

U.S. PATENT DOCUMENTS

| 2,868,338 | 1/1959 | Lucien et al. | 188/181 A |
| 3,467,444 | 9/1969 | Leiber | 188/181 A X |
| 3,494,670 | 2/1970 | Leiber | 303/119 |
| 3,498,683 | 3/1970 | Leiber | 303/105 |
| 3,549,212 | 12/1970 | Leiber | 303/119 |
| 3,554,612 | 1/1971 | Harned | 303/115 X |
| 3,556,610 | 1/1971 | Leiber | 303/105 |
| 3,563,350 | 2/1971 | Leiber | 303/97 X |
| 3,744,852 | 7/1973 | Riordan | 303/117 X |
| 3,744,855 | 7/1973 | Ochiai | 303/115 X |
| 3,817,585 | 6/1974 | Bowler et al. | 303/115 |

FOREIGN PATENT DOCUMENTS

2124052 12/1971 Fed. Rep. of Germany ............. 303/96

Primary Examiner—Stephen G. Kunin
Attorney, Agent, or Firm—Haseltine, Lake & Waters

[57] ABSTRACT

An anti-skid brake control device including a wheel cylinder having defined therein a first hydraulic chamber connected with a brake fluid line extending from the master cylinder and a second hydraulic chamber connected with a pressure controlling fluid circuit. As the brake fluid line is isolated from the pressure controlling circuit by the output member of the wheel cylinder, the brake system can operate effectively, though in a conventional manner, should oil leakage occur in the controlling circuit. On a four-wheeled vehicle, each pair of front or rear wheel cylinders can be served by a common arrangement of such pressure controlling circuit for anti-skid control.

2 Claims, 12 Drawing Figures

ANTI-SKID BRAKE CONTROL DEVICE

BACKGROUND OF THE INVENTION

This invention relates generally to brake systems for use with wheeled vehicles and more particularly to anti-skid brake control devices usable therein which are designed to automatically reduce the braking torque as exerted on the wheels when the danger of wheel locking is imminent so that the vehicle can be braked efficiently at all times without causing any skidding of the wheels.

Previously known forms of anti-skid brake control device are generally designed so that the brake fluid lines interconnecting the pressure output chamber of the brake fluid pressure producing unit, which is actuated by a brake pedal, and the hydraulic pressure receiving chambers of the brake assemblies, mounted at the respective vehicle wheels, are momentarily closed to reduce the pressure in these chambers when the danger of wheel locking is imminent.

With such anti-skid brake control device, however, there is the danger that the hydraulic pressure in the brake fluid lines could fail and render the brake system ineffective should oil leakage occur in the controlling fluid circuit of the device, which is arranged in connection with the brake fluid lines.

SUMMARY OF THE INVENTION

The present invention is intended to overcome the difficulties previously encountered as described above and has for its object the provision of a new and improved anti-skid brake control device for use with wheeled vehicles which is designed to minimize the danger of brake failure as resulting from leakage of hydraulic fluid.

Another object of the present invention is to provide an anti-skid brake control device of the character described which is simplified in structure and inexpensive.

The above and other objects and advantages of the present invention will become apparent from the following detailed description when taken in conjunction with the accompanying drawings.

DESCRIPTION OF THE PREFERRED EMBODIMENTS

Figure 1:
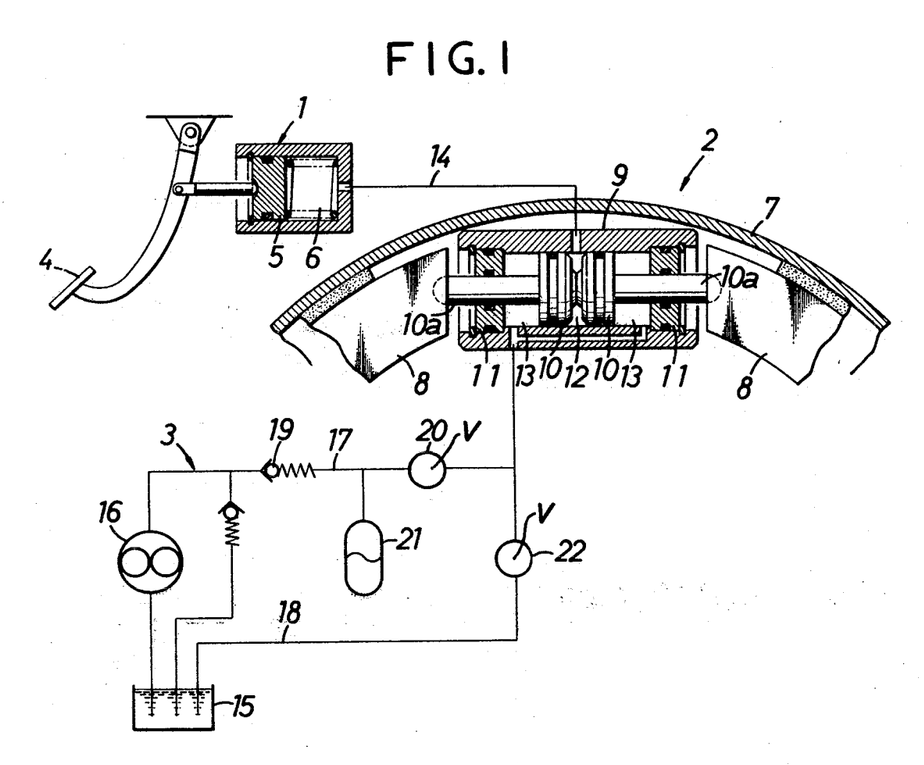
FIG. 1 is a partial schematic illustration of the whole system of a preferred embodiment of the present invention.

Referring first to FIG. 1, which illustrates a form of anti-skid brake control device embodying the present invention, reference numeral 1 generally indicates a brake fluid pressure producing unit; 2 indicates a brake mechanism operable under the pressure output of the fluid pressure producing unit 1 and equipped at each of the vehicle wheels; and 3 indicates a control system provided to feed the brake mechanism 2 with a hydraulic pressure which counteracts the output fluid pressure of the unit 1 to control the braking torque, which the brake mechanism 2 exerts upon the associated wheel. A description will next be made of the construction of these components in order.

The brake fluid pressure producing unit 1 takes the form of a brake master cylinder of well-known construction, which includes a pressure output chamber 6 filled with hydraulic oil and a piston 5 connected with a brake pedal 4 and operable to compress the chamber 6 to produce a desired hydraulic pressure output.

The brake mechanism 2, of the oil hydraulic form, is comprised of a brake drum 7 fixed to the wheel for rotation therewith, a pair of brake shoes 8—8 floatingly or rockably supported inside of the brake drum on a fixed panel, not shown, and a wheel cylinder 9 interposed between the movable end portions of the respective brake shoes 8—8. Slidably fitted in the wheel cylinder 9 are a pair of opposed output pistons which are formed integral with respective piston rods 10a—10a connected with the movable end portions of the brake shoes 8—8. In this manner, there is provided a first hydraulic chamber 12 between the two output pistons 10 with a pair of second hydraulic chambers 13—13 defined between each of the output pistons 10—10 and the adjacent one of end wall members 11—11 secured to the wheel cylinder 9 at its opposite open ends. As shown, the first hydraulic chamber 12 is in fluid communication with the pressure output chamber 6 of the brake master cylinder 1 by way of a brake fluid line 14.

As shown, the control system 3 includes an oil reservoir 15, an oil pressure source pump 16 having a suction port opening into the oil reservoir 15, a high-pressure oil line 17 extending from the delivery port of oil pump 16, and a low-pressure oil line 18 opening at one end into the oil reservoir 15. Both the high-pressure and low-pressure oil lines 17 and 18 are connected at the other end to the pair of second hydraulic chambers 13—13. Inserted in the high-pressure oil line 17 are a non-return valve 19 and a first control valve in the form of a normally-closed solenoid valve 20, which is arranged on the downstream side of nonreturn valve 19, with an accumulator 21 connected with the oil line 17 between the valves 19 and 20. Inserted in the low-pressure oil line 18 is a second solenoid valve 22, which is a normally-open control valve.

Figure 2:
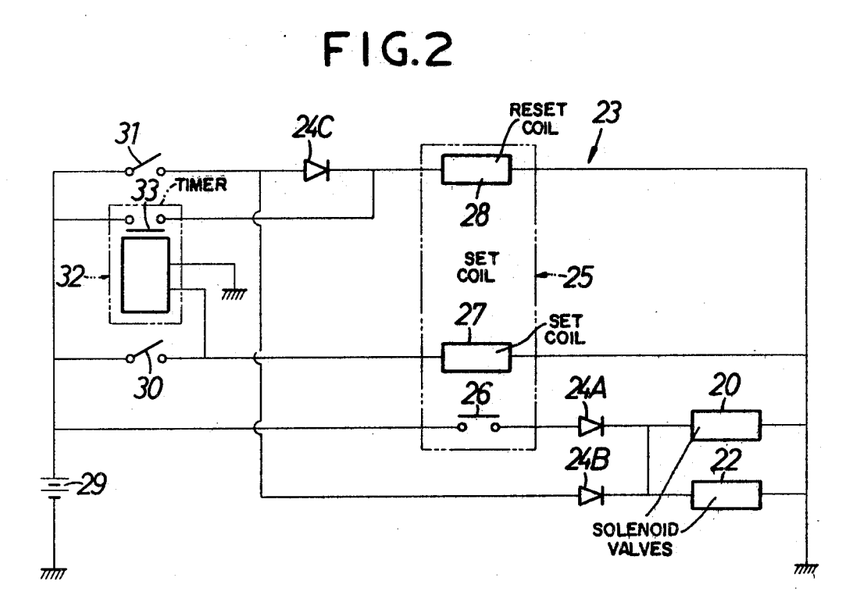
FIG. 2 is an electric circuit diagram illustrating a form of electric command system of the brake control device of FIG. 1.

The first and second solenoid valves 20 and 22 are operable under the control of an appropriate electric command system, one example of which is illustrated in the electric circuit diagram of FIG. 2.

Referring to FIG. 2, the two solenoid valves 20 and 22 have their solenoid coils connected in parallel with each other and both connected to a battery 29 through a diode 24A and the contact 26 of a keep relay 25. The keep relay 25 includes a set coil 27 which is connected with the battery 29 through the medium of a first sensor switch 30 and, when energized, operates to hold the contact 26 in closed position. The keep relay 25 also includes a reset coil 28, which is connected to the battery 29 by way of a diode 24C and a second sensor switch 31 and, when energized, acts to reset the relay contact 26 in its open position. The solenoid coils of the valves 20 and 22 are also connected through a diode 24B to the reset line between the second sensor switch 31 and diode 24C. It is to be noted that the first sensor switch 30 closes when it senses any angular deceleration exceeding a predetermined threshold value of the vehicle wheel as braked by the brake mechanism 2 while the second sensor switch 31 closes when it senses any angular acceleration exceeding a predetermined threshold value of the vehicle wheel. Both the two sensor switches may take any known form of inertial force sensing switch and their structure will not be described here in any detail.

Figure 3:
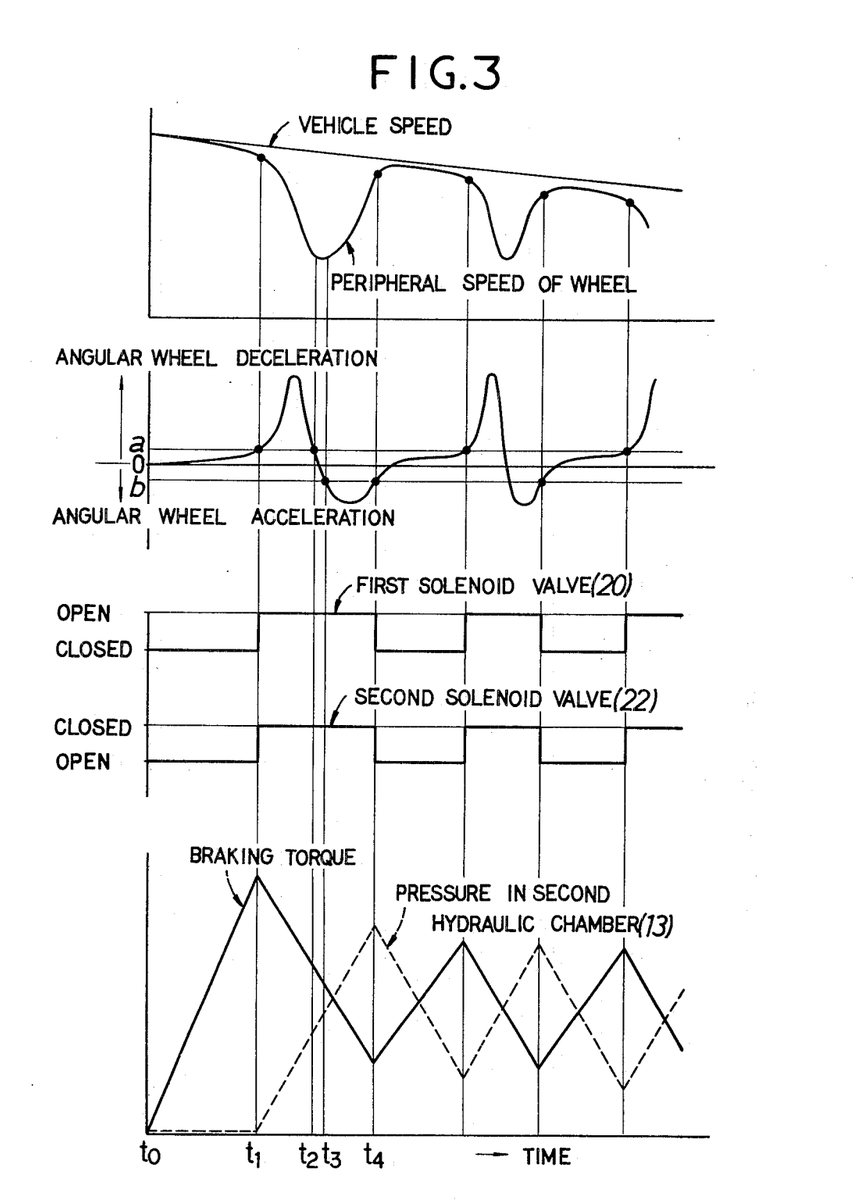
FIG. 3 is a characteristic diagram of the command system shown in FIG. 2.

Description will next be made of the operation of the embodiment described above with reference to the characteristic diagram of FIG. 3.

Suppose that, at a point of time $t_0$ during travel of the vehicle, the brake pedal 4 is depressed to actuate the brake master cylinder 1 and its output pressure is transmitted to the first hydraulic chamber 12 of the wheel cylinder 9. Then, under the oil pressure, the two output pistons 10—10 in the wheel cylinder are forced to slide outwardly in opposite directions to press the respective brake shoes 8—8 against the internal surface of brake drum 7 so that the wheel is subjected to a braking torque corresponding to the oil pressure fed into the first hydraulic chamber 12.

As the braking torque increases, the angular deceleration of the wheel increases and, when the danger of the wheel being locked is imminent, that is, when the magnitude of angular wheel deceleration reaches a preset threshold value a, the first sensor switch 30 closes upon sensing such angular deceleration so that the set coil 27 of keep relay 25 is energized to close the contact 26. This state of relay 25 is maintained even if the first sensor switch 30 is opened as long as the reset coil 28 remains de-energized. Upon the closing of relay contact 26, the first solenoid valve 20 is actuated to open while at the same time the second solenoid valve 22 is closed and the high-pressure and low-pressure fluid lines 17 and 18 are placed in and out of communication, respectively, with the pair of second hydraulic chambers 13—13 of the wheel cylinder 9. In this manner, the two second hydraulic chambers 13—13 are fed with oil pressure from the oil pump 16 or accumulator 21 and the oil pressure counteracts the one in the first hydraulic chamber 12. As the result, the braking torque being exerted on the wheel decreases and such decrease in braking torque continues even after the point of time $t_2$, when the angular deceleration of the wheel returns to the preset value a and the first sensor switch 30 opens. In this manner, the decreasing angular deceleration of the wheel finally vanishes and the wheel is subsequently subjected to angular acceleration.

The angular acceleration of the wheel increases initially with decrease of the braking torque and, at the point of time $t_3$, when a preset threshold value b is reached, the second sensor switch 31, sensing such acceleration, closes and the reset coil 28 of keep relay 25 is energized to reset the contact 26 into open position. At this time, however, the two solenoid valves 20 and 22 remain unchanged as their coils are held energized through the second sensor switch 31, now closed. The angular wheel acceleration starts to decrease as the peripheral velocity of the wheel approaches the speed of travel of the vehicle and, at the point of time $t_4$, when the peripheral speed of the wheel comes fully close to the vehicle speed, returns to the preset threshold value b, causing the second sensor switch 31 to open. Accordingly, since the contact 26 of keep relay 25 has already been reset to open, as described above, the first and second solenoid valves 20 and 22 are restored to their normally open and closed states, respectively, to place the low-pressure and high-pressure fluid lines 18 and 17, in and out of fluid communication with the pair of second hydraulic chambers 13—13 of wheel cylinder 9. As the result, the oil pressure in these chambers 13—13 decreases with oil flowing therefrom to the oil reservoir 15 and the braking torque again increases. From now on, the process described is repeated in substantially the same fashion. It will thus be appreciated that, with the brake control device described, the vehicle wheel is efficiently braked without any skid.

Incidentally, there is no assurance that, when the vehicle comes to stop under operation of the control system 3, the second sensor switch 31 be closed and the keep relay 25 reset. If the vehicle comes to stop with the keep relay 25 held in its set state or with the relay contact 26 held closed, the second hydraulic chambers 13—13 of the wheel cylinder 9 must remain in the high pressure state, involving the danger of causing trouble in the next cycle of braking operation.

In view of this, there is provided in the command system 23 of the brake control device an off-delay timer 32 which is actuated by the signal output from the first sensor switch 30 and has a contact 33 connected with the reset coil 28 of keep relay 25 in parallel with the second sensor switch 31. The timer contact 33 is arranged so as to open when reset and be held in set or closed position only during a period of time elapsing after the closing of the first sensor switch 30 till a predetermined length of time after the re-opening of the sensor switch 30.

With this arrangement, even if the second sensor switch 31 remains open, the keep relay 25 is reset without fail under the action of the off-delay timer 32 if only the first sensor switch 30 opens and when the predetermined length of time has elapsed after the switch opening and thus, the danger referred to above of causing trouble to the next cycle of braking operation is effectively eliminated. As will be readily noted, however, the time delay in the opening of timer contact 33, elapsing after the first sensor switch 30 has opened, should be so determined as to be longer than the length of time elapsed between the opening of first sensor switch 30 and the closing of second sensor switch 31, which is usually 0.05 second or less, in order not to incur any trouble in the normal anti-skid control operation.

Figure 4:
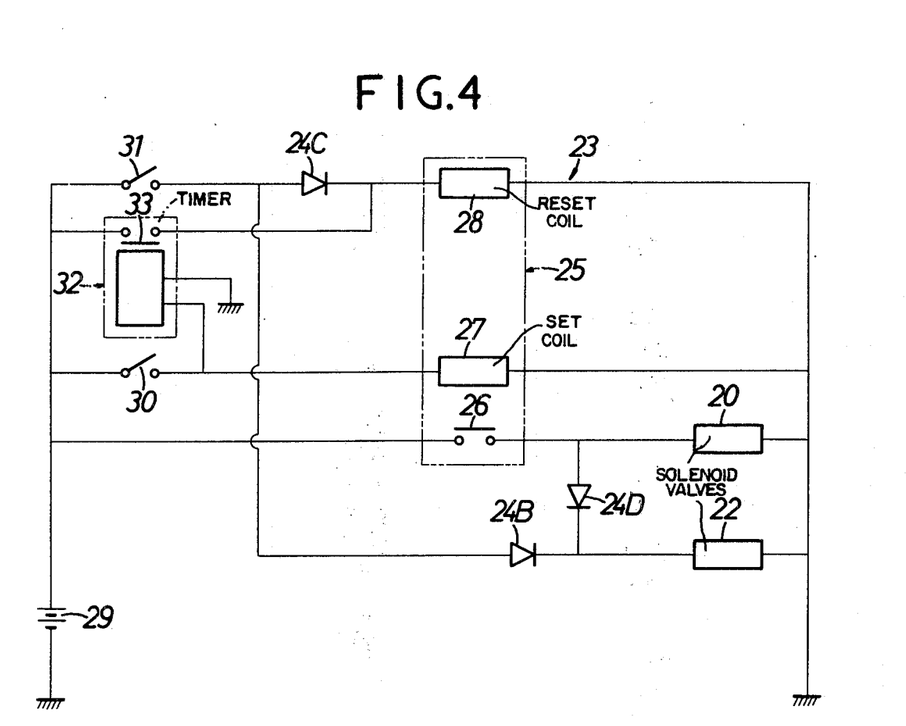
FIG. 4 is an electric circuit diagram of a modified form of command system.

FIG. 4 illustrates another form of command system 23 which is modified so that the first and second solenoid valves 20 and 22 are controlled with increased effectiveness for anti-skid control. This form of command system is similar in structure to the one shown in FIG. 2 except that a further diode 24D is inserted in the parallel connection of the coils of two solenoid valves 20 and 22, as shown. Those parts corresponding to the components of FIG. 2 are identified with the same reference numerals.

Description will next be made of the operation of this command system with reference to the characteristic diagram of FIG. 5.

As observed, the system of FIG. 4 initially operates in the same manner as that of FIG. 2 after the master cylinder 1 has been started to operate at the point of time $t_0$ until immediately before the angular acceleration of the wheel reaches the preset value b at time $t_3$, at which the second sensor switch 31 closes and thus the reset coil 28 of keep relay 25 is energized to reset the contact 26 in its open position. At this time, though the current passing through diode 24B is directed through the coil of second solenoid valve 22, it cannot flow to the coil of first solenoid valve 20 because of the presence of diode 24D and only the first solenoid valve 20 is restored to its closed position while the second solenoid valve 22 remaining in its actuated or closed position. Accordingly, the high-pressure and low-pressure fluid lines 17 and 18 are both closed and the pressure oil in the second hydraulic chambers 13—13 of the wheel cylinder 9 is held restrained therein, hydraulically locking the output pistons 10—10, with the result that the braking torque is held constant irrespective of the output pressure of brake master cylinder 1.

Subsequently, as time passes through the point $t_4$, at which the peripheral speed of the wheel comes fully close to the vehicle velocity, the angular acceleration of the wheel is reduced below the level b, causing the second sensor switch 31 to close. Thereafter, the system operates again in the same manner as with the case of FIG. 2.

With this arrangement, the output pistons 10—10 in the wheel cylinder 9 are hydraulically locked while the angular acceleration of the wheel remains above its predetermined threshold value (or below the level b as viewed in the diagram of FIG. 5), the peak value of the angular wheel acceleration is suppressed and the time period in which the peripheral speed of the wheel remains close to the vehicle speed while keeping the wheel against locking is substantially shortened. As the consequence, the braking efficiency is further improved, substantially reducing the braking distance of the vehicle when braked.

Figure 5:
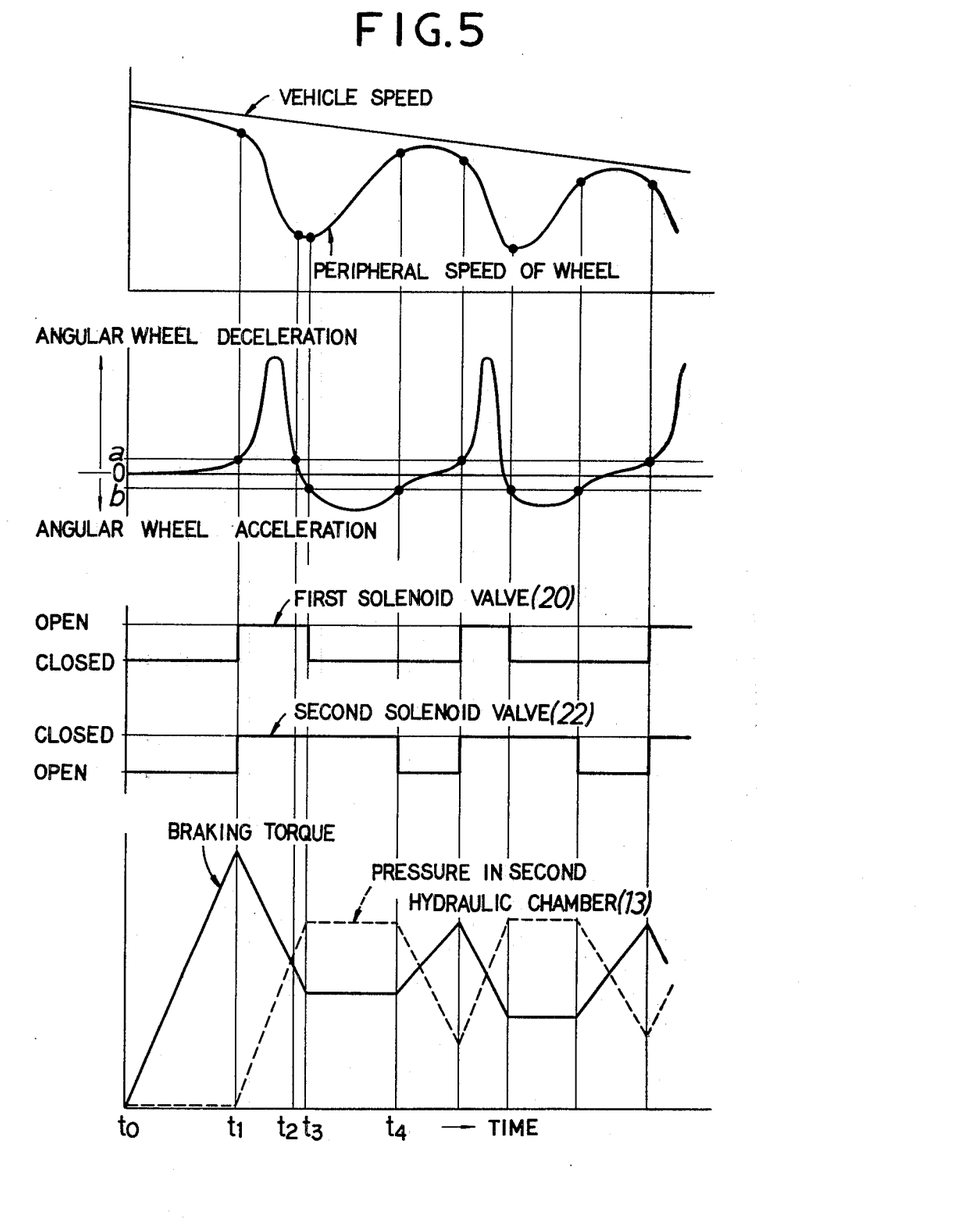
FIG. 5 is a characteristic diagram of the command system of FIG. 4.

Incidentally, it is not always necessary with the command system 23 that the preset threshold value of angular acceleration of the wheel at which the second sensor switch 31 closes be identical with that at which the switch again opens, as illustrated in FIG. 5. For example, with the case of a wheel which is hardly locked, the first acceleration setting for closing the second sensor switch 31 may safely be determined above the second setting for re-opening the switch and, with a wheel which is liable to be locked, the first setting may safely be determined below the second.

Figure 6:
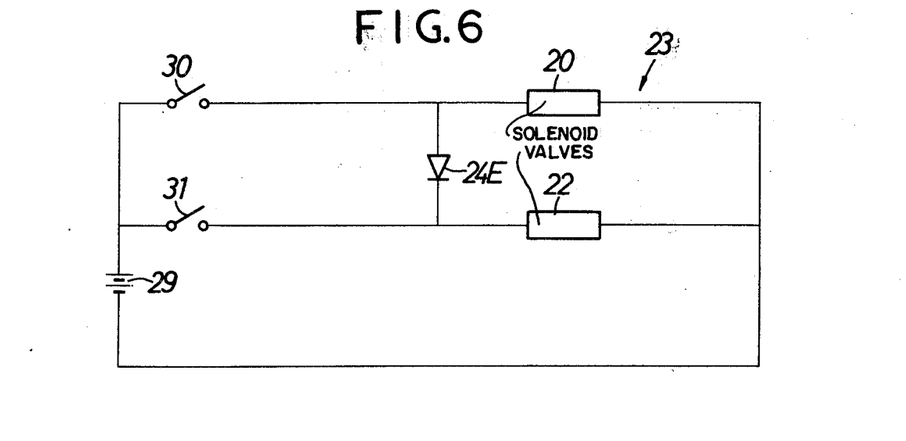
FIG. 6 is an electric circuit diagram of another modified form of command system.

Reference will next be had to FIG. 6, which illustrates another form of command system 23 which is most simplified in construction. As observed, the first and second sensor switches 30 and 31 are inserted in the respective lines connecting the coils of the first and second solenoid valves 20 and 22 to the battery 29 in parallel with each other, with a diode 24E arranged across the lines on that side of the two sensor switches 30 and 31 remote from the battery 29. As with the case of the embodiments of FIGS. 2 and 4, the first sensor switch 30 is arranged to close upon sensing the angular deceleration of the wheel as braked by the brake mechanism 2 when the wheel deceleration exceeds a preset threshold value a. Similarly, the second sensor switch 31 is so arranged as to close upon sensing the angular acceleration of the wheel when it exceeds a preset threshold value b.

Figure 7:
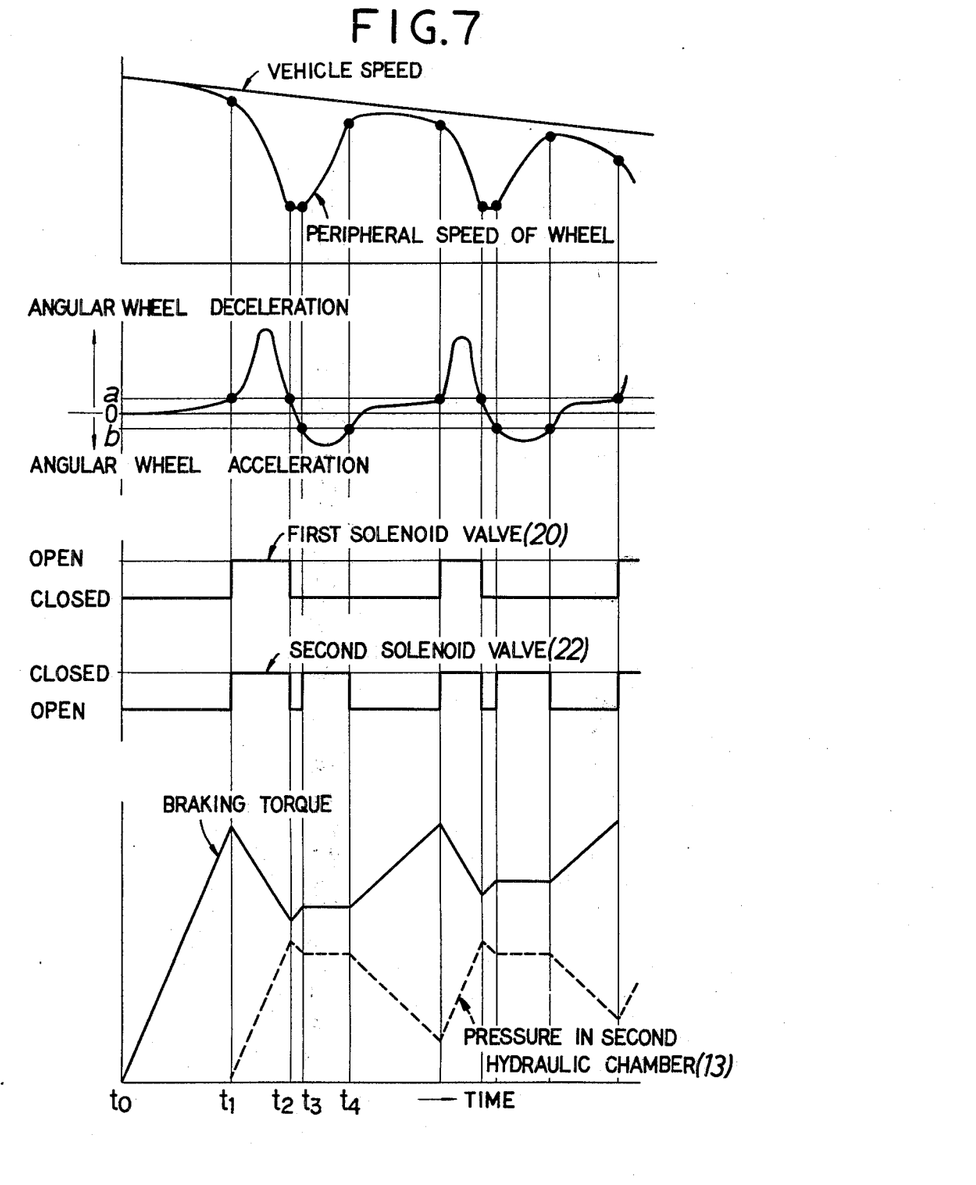
FIG. 7 is a characteristic diagram of the command system of FIG. 6.

Description will next be made of the operation of this embodiment with reference to the characteristic diagram of FIG. 7.

In the event the brake pedal 4 is depressed to activate the brake master cylinder 1 during vehicle travel at the point of time $t_0$, output fluid pressure of the brake master cylinder 1 is transmitted to the first hydraulic chamber 12 of wheel cylinder 9 to force the pistons 10—10 outwardly apart from each other, so that the brake shoes 8—8 are pressed against the internal surface of brake drum 7, thus exerting upon the wheel a braking torque corresponding to the oil pressure fed to the first hydraulic chamber 12.

As the braking torque increases, the angular deceleration of the wheel increases and, when the danger of the wheel being locked is imminent, that is, at the instant when the angular wheel deceleration has reached the preset value a, the first sensor switch 30 closes to energize the coils of the two solenoid valves 20 and 22 and thus the normally closed, first solenoid valve 20 opens while the normally open, second solenoid valve 22 closes so that the high-pressure and low-pressure fluid lines 17 and 18 are placed respectively in and out of fluid communication with the pair of second hydraulic chambers 13—13 of wheel cylinder 9, which are thus fed with oil pressure from the oil pump 16 or accumulator 21. The oil pressure thus built up in the second hydraulic chambers 13—13 counteracts the oil pressure fed to the first hydraulic chamber 12. In this manner, the braking torque is reduced with increase in oil pressure in the second hydraulic chambers 13—13 and the danger of wheel locking is precluded.

The angular deceleration of the wheel decreases with a decrease of the braking torque and, at the point of time $t_2$ at which the wheel deceleration again reaches a preset threshold value a, the first sensor switch 30 again opens and the two solenoid valves 20 and 22 are both restored to their normal position, placing the low-pressure and high-pressure fluid lines 18 and 17 respectively in and out of fluid communication with the pair of second hydraulic chambers 13—13. Accordingly, the oil pressure in these hydraulic chambers 13—13 starts to decrease, causing the braking torque again to rise. The angular deceleration of the wheel, still continuing to decrease owing to the delay in operation of the brake mechanism 2, soon disappears and is succeeded by angular acceleration of the wheel. Subsequently, when the wheel acceleration reaches a preset threshold value b at $t_3$, this time the second sensor switch 31 closes, sensing the acceleration value, and only the coil of second solenoid valve 22 is energized, the coil of first solenoid valve 20 remaining de-energized because of the presence of diode 24E. Upon closing of the second solenoid valve 22, which is in the low-pressure fluid line 18, reduction in pressure in the second hydraulic chambers 13—13 of wheel cylinder 9 is interrupted, that is, the oil pressure in the two chambers 13—13 is fixed at a definite level. As the result, the output pistons 10—10 are hydraulically locked to maintain the magnitude of the braking torque at a definite level irrespective of the pressure output of the brake master cylinder 1.

Subsequently, as the peripheral speed of the wheel approaches the vehicle speed, the angular acceleration of the wheel begins to decrease and returns to the preset value b at time $t_4$, when the peripheral velocity of the wheel comes fully close to the vehicle speed. At the same time, the second sensor switch 31 opens to restore the second solenoid valve 22 to its open position and the low-pressure fluid line 18 is placed in communication with the pair of second hydraulic chambers 13—13 so that the oil pressure in the latter again begins to decrease, causing the braking torque to rise. Thereafter, substantially the same process as that described above is repeated, as shown in the diagram. To summarize, in this braking operation, the braking torque exerted upon the wheel begins to decrease when the angular deceleration of the wheel exceeds a preset threshold value with an excess of braking operation and then begins to increase again when the wheel deceleration is reduced below the preset value. Subsequently, when the angular acceleration of the wheel, succeeding the wheel deceleration, exceeds a present threshold value, the braking torque ceases to increase to maintain a definite value. It will be appreciated, therefore, that with this command system any excessive reduction in braking torque as resulting from delay in operation of the brake mechanism is effectively avoided, and the braking torque can be kept at a definite level effective for proper braking operation for a time after the angular acceleration of the wheel has reached the preset threshold value and the danger of the wheel being locked has disappeared. Further, when the angular acceleration of the wheel is subsequently reduced below its preset threshold value, the braking torque begins again to rise above the definite level referred to above. It will be appreciated, therefore, that, with this command system, the width of variation in braking torque value from its bottom to its peak and hence the length of time required for the torque rise to the peak value can be effectively reduced; in other words, the braking torque can be rapidly restored for effective braking operation without causing any substantial vibration to the vehicle. This not only eliminates the danger of impairing the driver's feeling in braking operation but also improves the braking efficiency, enabling reduction in braking distance of the vehicle.

Figure 8:
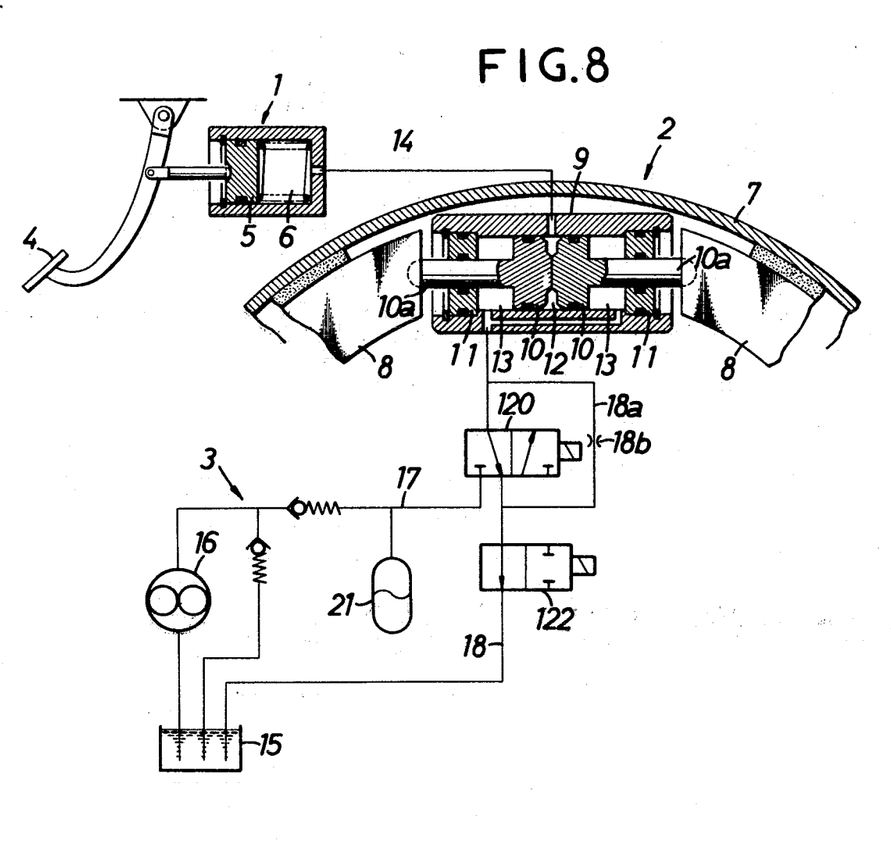
FIG. 8 is a partial schematic illustration of the whole system of another preferred embodiment of the present invention.

Reference will next be had to FIG. 8, which illustrates a modification of control system 3 of FIG. 1 designed to further improve the braking efficiency and reduce the braking distance of the vehicle.

As illustrated, the control system 3 includes a first solenoid valve 120 which is arranged across the high-pressure fluid line 17, provided to connect the pair of second hydraulic chambers 13—13 of the brake mechanism 2 with the oil pressure pump 16, and the low-pressure fluid line 18, provided to connect the pair of second hydraulic chambers 13—13 with the oil reservoir 18, to serve the purpose of selectively placing the two fluid lines 17 and 18 in fluid communication with the pair of second hydraulic chambers 13—13. In the normal state, the solenoid valve 120 is held in a position to place the low-pressure fluid line 18 in communication with the pair of second hydraulic chambers 13—13. Inserted in the low-pressure fluid line 18 is a second solenoid valve 122, which is a normally open control valve. The low-pressure fluid line 18 is connected with a bypass line 18a detouring the first solenoid valve 120 and which includes an orifice or restriction 18b, as shown.

Figure 9:
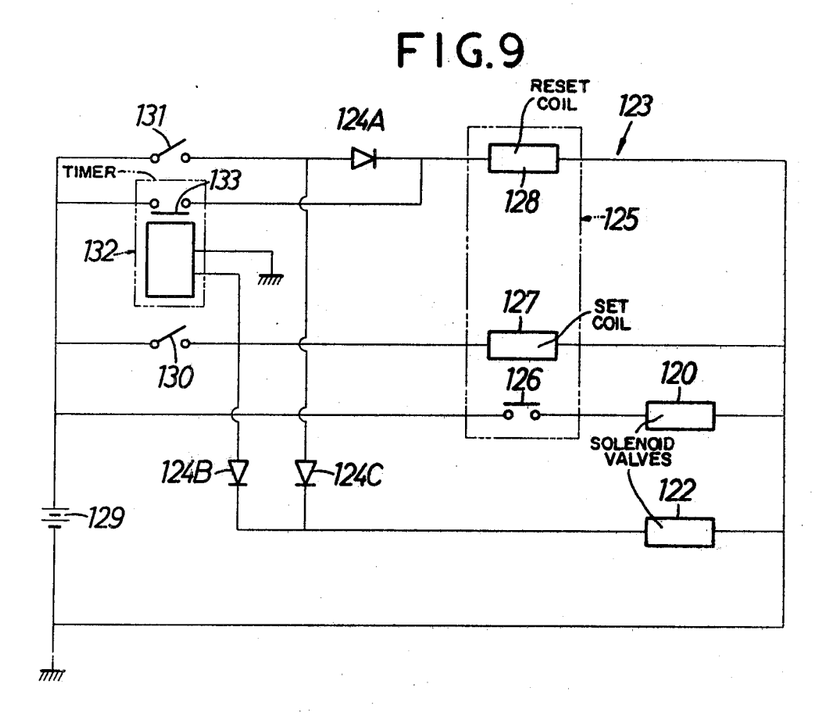
FIG. 9 is an electric circuit diagram illustrating the command system of the embodiment of FIG. 8.

FIG. 9 illustrates an electric circuit connection of a command system 123 provided to control the first and second solenoid valves 120 and 122.

Referring to FIG. 9, the coil of first solenoid valve 120 is connected to a battery 129 through the contact 126 of a keep relay 125, which includes a set coil 127 which acts, when energized, to set the relay contact 126 in its closed position, and a reset coil 128 which acts, when energized, to reset the relay contact 126. As illustrated, a first sensor switch 130 is inserted in the line interconnecting the set coil 127 and the battery 129 while a second sensor switch 131 and a diode 124A are inserted in series connection in the line interconnecting the reset coil 128 and the battery 129. The coil of second solenoid valve 122 is also connected to that side of the first and second sensor switches which is remote from the battery 129 though diodes 124B and 124C, respectively. The first sensor switch 130 is designed to close when it senses an angular deceleration of the wheel, as braked by the brake mechanism 2, which is of a preset threshold value a or above. Similarly, the second sensor switch 131 is designed to close upon sensing an angular acceleration of the wheel which is of a preset threshold value b or above. These sensor switches may take the form of a well-known inertial force sensing switch and any detailed description of their structure is omitted here.

Figure 10:
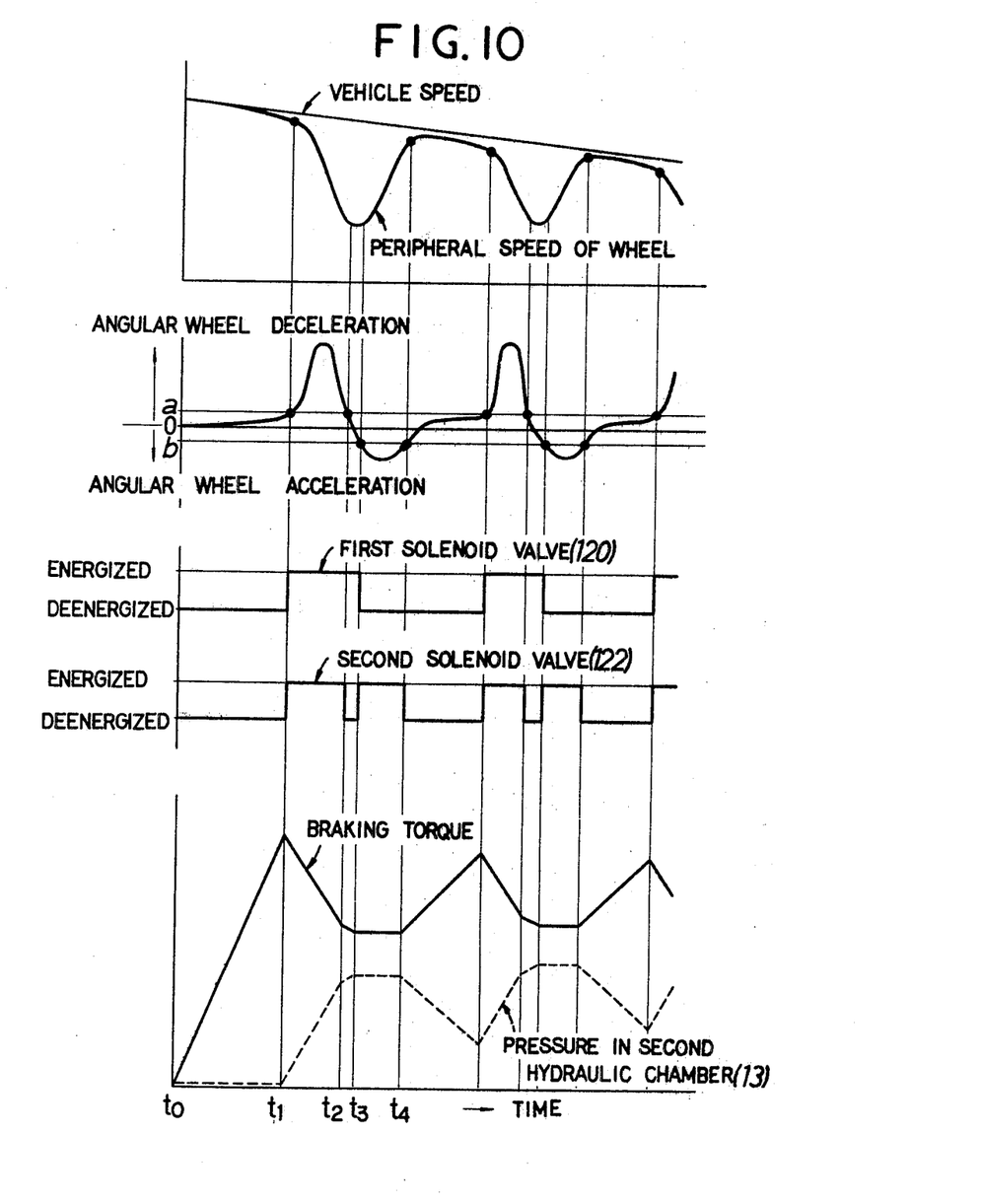
FIG. 10 is a characteristic diagram of the command system shown in FIG. 9.

The operation of the command system 123 will next be described with reference to the characteristic diagram of FIG. 10.

When the brake pedal 4 is depressed to actuate the brake master cylinder 1 at the point of time $t_0$ during travel of the vehicle, the output pressure of the brake master cylinder 4 is transmitted to the first hydraulic chamber 12 in the wheel cylinder 9 so that the paired output pistons 10—10 in cylinder 9 are forced outwardly apart from each other to press the brake shoes 8—8 against the internal surface of the brake drum 7 and thus a braking torque corresponding to the hydraulic pressure building up in the first hydraulic chamber 12 is applied to the wheel.

As the braking torque increases, the angular wheel deceleration increases and, when the danger of wheel locking is imminent, that is, when the angular wheel deceleration has reached its preset threshold value a, the first sensor switch 130 closes, sensing such rise of the angular wheel deceleration. As the result, the second solenoid valve 122, which is normally open, is energized through the first sensor switch 130 to close. Simultaneously with this, the set coil 127 of keep relay 125 is energized through the first sensor switch 130 to close the relay contact 126 and the first solenoid valve 120 is energized therethrough and transferred to the right, as viewed in FIG. 8, to open the high-pressure fluid line 17 while at the same time closing the low-pressure fluid line 18. Accordingly, the second hydraulic chambers 13—13 in the wheel cylinder 9 are both fed with oil pressure from the oil hydraulic pump 16 or accumulator 21 and the oil pressure counteracts the oil pressure being fed to the first hydraulic chamber 12. In this manner, the braking torque being exerted upon the wheel by the brake mechanism 2 is rapidly reduced with increase in pressure in the second hydraulic chambers 13—13 so that the danger of wheel locking is effectively avoided.

Subsequently, when the angular wheel deceleration, which decreases as the braking torque continues to decrease, falls to its preset value a at time $t_2$, the first sensor switch 130 reopens and the second solenoid valve 122 restores its normal position shown in FIG. 8. The first solenoid valve 120 is kept in the position transferred to the right by means of the keep relay 125. As a consequence, the second hydraulic chambers 13—13 are also placed in fluid communication with the low-pressure fluid line 18 by way of the bypass line 18a having orifice 18b inserted therein so that part of the pressure oil being fed to the second hydraulic chambers 13—13 through the high-pressure fluid line 17 is allowed to leak into the low-pressure fluid line 18 at a flow rate appropriately limited by the orifice 18b. This reduces the rate of pressure rise in the second hydraulic chambers 13—13 and hence the rate of reduction of the braking torque.

Subsequently, when the angular wheel acceleration, arising upon disappearance of the angular wheel deceleration, reaches a preset value b at time $t_3$, this time the second sensor switch 131 closes, sensing such rise of angular wheel acceleration, to energize the preset coil 128 of keep relay 125 and the relay contact 126 is reset to its open position. As the result, the first solenoid valve 120 restores its normal left position while the second solenoid valve 122 is again energized to assume its closed position. In this manner, the high-pressure and low-pressure fluid lines 17 and 18 are both fully closed so that the oil pressure in the second hydraulic chambers 13—13 is held at a definite level irrespective of the output pressure of the brake master cylinder 1. On this occasion, any excessive rise in pressure in the second hydraulic chambers 13—13 is effectively prevented despite of more or less delay in operation of the second solenoid valve 122 since the rate of pressure rise in the second hydraulic chambers 13—13 has been reduced immediately before the valve operation. Owing to this, the braking torque, of a predetermined magnitude, can be continuously applied without involving the danger of wheel locking.

Subsequently, as the peripheral speed of the wheel approaches the vehicle speed, the angular wheel acceleration begins to decrease and returns to its preset value b when the peripheral speed of the wheel comes fully close to the vehicle speed at time $t_4$. Simultaneously with this, the second sensor switch 131 opens and the second solenoid valve 122 restores its open position to open the low-pressure fluid line so that the pressure in the second hydraulic chambers 13—13 again begins to decrease thereby causing the braking torque to increase. The time required for the braking torque to rise from the predetermined value referred to above to its peak value is relatively short and this means that the length of time during which there is no effective braking action with the peripheral speed of the wheel kept fully close to the vehicle speed is substantially shortened. The process described above is repeated thereafter in substantially the same fashion as described so that the vehicle is efficiently braked without involving any wheel skidding.

In this connection, there is no assurance that the second sensor switch 131 closes to reset the keep relay 125 when the vehicle comes to stop under the operation of control system 3. If the vehicle comes to stop with the keep relay 125 held in its set position, that is, with the relay contact 126 held closed, the second hydraulic chambers 13—13 in wheel cylinder 9 will be held at raised pressure for a relatively long period of time on account of the throttling effect of orifice 18b, thus involving the danger of causing trouble in the next cycle of braking operation.

To avoid this, the command system 123 illustrated is provided with an off-delay timer 132 which is operable upon the output signal from the first sensor switch 130 with a timer contact 133 connected to the reset coil 128 of keep relay 125 in parallel with the second sensor switch 131. The timer contact 133 is arranged so as to open when reset and be held in set or closed position only during a period of time elapsing from the point of time at which the first sensor switch 130 is closed until a predetermined length of time after the re-opening of the sensor switch 130.

With this arrangement, even if the second sensor switch 131 remains open, the keep relay 125 is reset without fail under the resetting action of the off-delay timer 132 if only the first sensor switch 130 opens and when the predetermined length of time has elapsed after the switch opening, and accordingly any danger of causing trouble in the next cycle of braking operation, as stated above, is effectively eliminated. Obviously, the time of delay in opening of the timer contact 133, as elapsing after the opening of first sensor switch 130, should be so determined as to be longer than the length of time elapsing between the opening of the first sensor switch 130 and the closing of the second sensor switch 131, which is usually 0.05 second or less, in order not to incur any trouble in the normal anti-skid control operation.

According to this embodiment, when in a braking operation, the angular wheel deceleration is reduced below its preset threshold value after the braking torque has been rapidly reduced in order to avoid the danger of wheel locking. The rate of reduction in braking torque is reduced and subsequently the braking torque is held at a definite reduced level until the angular acceleration of the wheel, arising upon disappearance of the angular wheel deceleration and once rising above a preset threshold value, returns to this value. In this manner, the reduction in braking torque can be kept to a required minimum and, accordingly, the width of variation in braking torque value from its bottom to its peak and hence the length of time required for the braking torque rise to its peak value can be effectively reduced; that is to say, the braking torque can be rapidly restored for effective braking operation without causing any substantial vibration to the vehicle. This not only eliminates the danger of impairing the driver's feeling in braking operation but also improves the braking efficiency, enabling reduction in braking distance of the vehicle.

Figure 11:
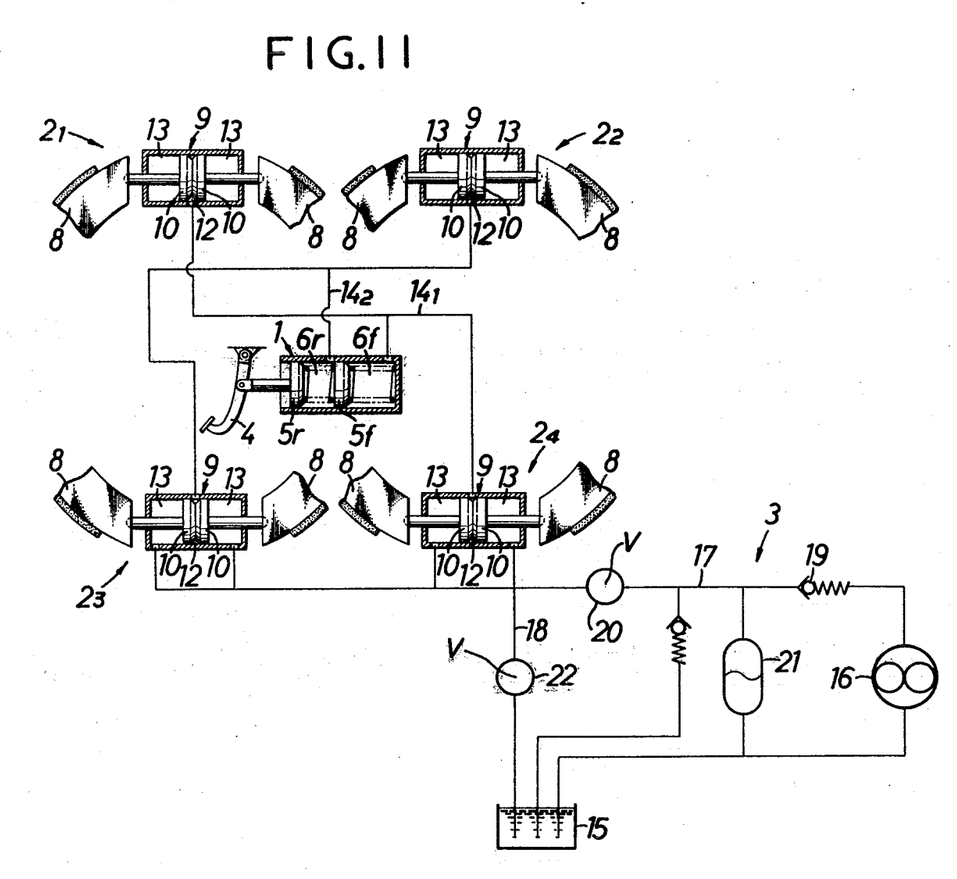
FIG. 11 illustrates the whole system of a further embodiment of the present invention.

Reference will next be had to FIG. 11, which illustrates one example of application of the present invention to a four-wheeled automobile equipped with a dual-line brake system.

In this illustration, the brake master cylinder 1 is of a well-known tandem structure including a rear hydraulic piston 5r, connected with a brake pedal 4, and a floating, front hydraulic piston 5f, a pair of front and rear hydraulic power chambers 6f and 6r defined in the cylinder by the hydraulic pistons 5f and 5r. Reference numerals $2_1$ and $2_2$ indicate a first and a second brake mechanism respectively associated with the left and right front wheels of the vehicle and numerals $2_3$ and $2_4$, a third and a fourth brake mechanism respectively associated with the left and right rear wheels. These brake mechanisms are the same in structure as the brake mechanism 2 shown in FIG. 1 and are shown with the same references retained for equivalent members. The brake mechanisms are connected with the brake master cylinder 1 by a so-called X type pipe arrangement, which includes a first and a second brake fluid line $14_1$ and $14_2$. The first fluid line $14_1$, extending from the front hydraulic chamber $6f$ of brake master cylinder 1, is connected to the first hydraulic chambers 12 of the first and fourth brake mechanisms $2_1$ and $2_4$ while the second fluid line $14_2$, extending from the rear hydraulic chamber $6r$ of brake master cylinder 1, is connected with the first hydraulic chambers 12 of the second and third brake mechanisms $2_2$ and $2_3$.

In this connection, it is to be noted that, in practicing the present invention, the fluid line arrangement may take any form other than the X arrangement and, for example, the first fluid line $14_1$ may be connected with the first and third brake mechanisms $2_1$ and $2_3$ with the second fluid line $14_2$, in this case, connected with the second and fourth brake mechanisms $2_2$ and $2_4$.

As observed, the control system 3 of FIG. 11 is similar in structure to the one shown in FIG. 1, including a high-pressure and a low-pressure fluid line 17 and 18 both connected with the pairs of second hydraulic chambers 13—13 of third and fourth brake mechanisms $2_3$ and $2_4$.

Figure 12:
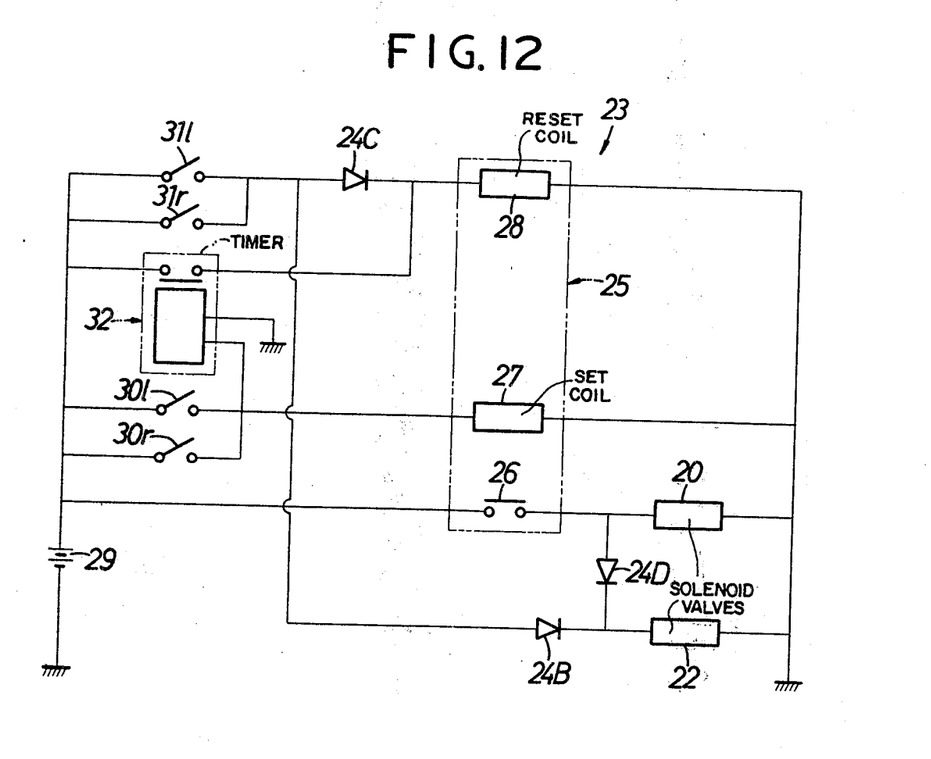
FIG. 12 is an electric circuit diagram illustrating the command system of the embodiment shown in FIG. 11.

FIG. 12 illustrates a command system 23 employed to control the first and second solenoid valves 20 and 22 in the control system 3 of FIG. 11. The command system 23 is principally the same in structure as that shown in FIG. 4 except that it includes a pair of first sensor switches $30l$ and $30r$ provided to sense any angular deceleration of the left and right rear wheels exceeding a present threshold value a, and a pair of second sensor switches $31l$ and $31r$ provided to sense any angular acceleration of the respective rear wheels exceeding a preset threshold value b.

In operation, if only one of the first sensor switches $30l$ and $30r$ closes with an imminent danger of the associated rear wheel being locked, the braking torques of the third and fourth brake mechanisms $2_3$ and $2_4$ are reduced simultaneously in substantially the same manner as with the case of the system shown in FIG. 4 and the other rear wheel is kept at a peripheral speed approximating the vehicle speed. Subsequently, during the period of time that the other rear wheel is subjected to an angular acceleration exceeding the aforesaid preset threshold value b, the braking torque is held at a definite level, and thereafter it again increases. In this manner, the brake control is effected upon the basis of one or the other of the rear wheels which is liable to be locked and there arises some loss in braking capacity of the rear wheel which is less liable to be locked. Such loss, however, is very slight and practically negligible.

Incidentally, it will be apparent that the first and second brake mechanisms $2_1$ and $2_2$ may also be arranged so as to be controlled in the manner described above.

It will be recognized that, in a dual-line brake system, the anti-skid control of the two rear or front wheels can be effected by means of a single control system 3 irrespective of the arrangement of the first and second brake fluid lines $14_1$ and $14_2$, enabling realization of an inexpensive anti-skid brake system.

To summarize, in this embodiment of the present invention, the hydraulic brake mechanism associated with each of the vehicle wheels is provided with a first hydraulic chamber defined on one side of the operating member such as an output piston and placed in fluid communication with a hydraulic pressure producing unit such as a brake master cylinder and a second hydraulic chamber defined on the other side of the operating member. In the braking operation, the second hydraulic chamber is fed with a fluid pressure effective to counteract the one acting in the first hydraulic chamber in order to reduce the braking torque when the danger of wheel locking is imminent, whereby the vehicle can be braked with good efficiency without causing any wheel skidding. Moreover, even if oil leakage occurs in the oil control circuit connected with the second hydraulic chamber, there is no danger of the brake oil leaking out of the brake fluid circuit including the brake master cylinder since the brake fluid circuit is isolated from the oil control circuit by the operating member of the brake mechanism. This enables the anti-skid brake system to operate effectively, though in a conventional manner, despite such oil leakage in the oil control circuit, thus giving a particularly high reliability to the system.

Though a few preferred embodiments of the present invention have been shown and described, it will be apparent to those skilled in the art that various changes and modifications may be made therein without departing from the spirit of the invention or from the scope of the appended claims.

What is claimed is:

1. An improved anti-skid brake control system for use with wheeled vehicles including, a brake fluid pressure producing unit; a wheel cylinder associated with a vehicle wheel and being hydraulically connected to said unit for application of a brake force, said wheel cylinder having a piston slidable therein with a brake applying element connected thereto, fluid control valve means connected to high and low pressure lines; means connected to said fluid control valve means for sensing locking of said wheel, to thereupon produce an output signal actuating said fluid control valve means, the improvement comprising: a first hydraulic chamber formed in said wheel cylinder with a piston member disposed on one side thereof and being directly connected to said unit for applying a hydraulic pressure to said piston member for brake application; a second hydraulic chamber formed in said wheel cylinder by said piston member on the opposite side thereof, being connected with said high and low pressure lines through said fluid control valve means, for applying a regulated hydraulic pressure to said piston member for counteracting hydraulic pressure applied thereto.

2. An anti-skid brake control device as defined in claim 1, in which said sensing system is so constructed as to produce such an output signal to said fluid control valve means that said high-pressure and low-pressure fluid lines are respectively, held open and closed, after the angular deceleration of the wheel has reached a predetermined threshold value until the angular acceleration of the wheel arising upon disappearance of the angular wheel deceleration falls to a predetermined threshold value.

* * * * *